United States Patent
Kumar et al.

(10) Patent No.: US 7,768,923 B2
(45) Date of Patent: Aug. 3, 2010

(54) PACKET AGING IN A WIRELESS NETWORK

(75) Inventors: Rajneesh Kumar, San Jose, CA (US); David Sheldon Stephenson, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 664 days.

(21) Appl. No.: 11/673,494

(22) Filed: Feb. 9, 2007

(65) Prior Publication Data

US 2008/0192634 A1 Aug. 14, 2008

(51) Int. Cl.
*G06F 11/00* (2006.01)
(52) U.S. Cl. .................................. 370/235; 370/352
(58) Field of Classification Search ............ 370/30, 370/328, 338, 352, 912, 913, 395.21–395.43; 715/700–704, 708, 734–735; 455/550.1, 455/556.2, 561, 566, 466, 69, 450–453
See application file for complete search history.

(56) References Cited

U.S. PATENT DOCUMENTS

| | | | | |
|---|---|---|---|---|
| 6,009,077 A * | 12/1999 | Firoiu et al. | ............... | 370/230 |
| 6,680,976 B1 * | 1/2004 | Chen et al. | ............. | 375/240.26 |
| 6,684,273 B2 * | 1/2004 | Boulandet et al. | ............. | 710/52 |
| 6,700,893 B1 * | 3/2004 | Radha et al. | ............... | 370/412 |
| 6,865,185 B1 * | 3/2005 | Patel et al. | .................. | 370/412 |
| 7,158,788 B2 * | 1/2007 | Holler | ........................ | 455/445 |
| 7,161,905 B1 * | 1/2007 | Hahn et al. | ................. | 370/231 |
| 7,301,897 B2 * | 11/2007 | Lutgen et al. | ............... | 370/229 |
| 7,372,865 B2 * | 5/2008 | Scott et al. | ................. | 370/429 |
| 7,406,098 B2 * | 7/2008 | Taneja et al. | ............... | 370/468 |
| 7,408,948 B2 * | 8/2008 | Lopponen | .................. | 370/433 |
| 7,453,897 B2 * | 11/2008 | Enbom et al. | ............... | 370/412 |
| 7,463,892 B2 * | 12/2008 | Eiger et al. | ............. | 455/452.2 |
| 7,474,624 B2 * | 1/2009 | Grossman | ................... | 370/252 |
| 2002/0075835 A1 * | 6/2002 | Krishnakumar et al. | ..... | 370/338 |
| 2003/0091033 A1 * | 5/2003 | Van den Boeck et al. | ... | 370/352 |
| 2003/0103451 A1 * | 6/2003 | Lutgen et al. | ............... | 370/229 |
| 2003/0117954 A1 * | 6/2003 | De Neve et al. | ............ | 370/230 |
| 2003/0119515 A1 * | 6/2003 | Holler et al. | ................ | 455/445 |
| 2005/0195740 A1 * | 9/2005 | Kwon | ........................ | 370/229 |
| 2006/0109833 A1 * | 5/2006 | Uh et al. | ..................... | 370/346 |
| 2006/0133346 A1 * | 6/2006 | Chheda et al. | ............. | 370/352 |
| 2006/0156201 A1 * | 7/2006 | Zhang et al. | ................ | 714/776 |

(Continued)

OTHER PUBLICATIONS

S. Floyd and V. Jacobson, "Random Early Detection Gateways for Congestion Avoidance," IEEE/ACM Transactions on Networking, vol. 1 No. 4, Aug. 1993, pp. 397-413.

(Continued)

*Primary Examiner*—Lun-Yi Lao
*Assistant Examiner*—Nathan Taylor
(74) *Attorney, Agent, or Firm*—Dov Rosenfeld; Inventek

(57) ABSTRACT

A method and software to cause a processor to implement a method to set a packet age limit in an access point of a wireless network for communicating time-sensitive data with an associated wireless client station. One method includes the client station sending feedback to the access point so that the access point can set its packet age limit. Another method includes the access point setting its packet age limit according to feedback from the associated client station and/or according to information determined at the access point about the network.

25 Claims, 6 Drawing Sheets

U.S. PATENT DOCUMENTS

| | | | | |
|---|---|---|---|---|
| 2006/0268713 | A1* | 11/2006 | Lundstrom | 370/235 |
| 2007/0047570 | A1* | 3/2007 | Benveniste | 370/448 |
| 2007/0058652 | A1* | 3/2007 | Hahn et al. | 370/412 |
| 2007/0070894 | A1* | 3/2007 | Wang et al. | 370/230 |
| 2007/0073805 | A1* | 3/2007 | Jorgensen | 709/203 |
| 2008/0279159 | A1* | 11/2008 | Kumar et al. | 370/338 |
| 2009/0067341 | A1* | 3/2009 | Awais | 370/253 |

OTHER PUBLICATIONS

"Weighted Random Early Detection on the Cisco 12000 Series Router," Cisco Systems, Inc., San Jose, CA. Downloaded Apr. 30, 2007 from http://www.cisco.com/univercd/cc/td/doc/product/software/ios112/ios112p/gsr/wred gs.pdf.

C. Brandauer, G. Iannaccone, C. Diot, T. Ziegler, S. Fdida and M. May, "Comparison of Tail Drop and Active Queue Management Performance for Bulk-data and Web-like Internet Traffic," Proceedings of the Sixth IEEE Symposium on Computers and Communications, 2001, Salzburg Res., Austria, Jul. 3-5, 2001, pp. 122-129.

C. Schurgers and M.B. Srivastava, "Voice Over Wireless Internet: Performance Interaction of Signal Processing Algorithms and Network Protocols," *IEEE Vehicular Technology Conference (VTC'99 Spring)*, Houston, Texas, May 16-22, 1999, pp. 1935-1939.

"Understanding Delay in Packet Voice Networks," Cisco White Paper, Cisco Systems, Inc., San Jose, CA, Document ID: 5125. Downloaded Jan. 23, 2007 from: http://www.cisco.com/warp/public/788/voip/delay-details.html.

\* cited by examiner

PACKET AGING IN A WIRELESS NETWORK

TECHNICAL BACKGROUND

The present disclosure is related generally to wireless packet networks.

BACKGROUND

Time-sensitive data communication, e.g., audio and/or video data, e.g., voice over IP (VoIP) is increasingly transported in wireless networks such as wireless local area network (WILANs). Packets containing time-sensitive data, e.g., voice or audio/video have a maximum delay, and furthermore, packets belonging to a stream, e.g., a UDP stream for UDP/IP communication are dropped by the MAC processor after some time, as they must not age beyond what is called the UDP timeout. Packet aging refers to the process, e.g., at an AP wherein packets are dropped after some time, which may be less than their allowed maximum delay in order to accommodate any sending and/or receiving buffers. Packet aging is an important mechanism that helps balance network load vis-a-vis voice quality of a traffic stream. The basic idea behind packet aging is to age out the packets in the AP voice queue if the packets have been sitting there for sometime because these packets may be too late to be played out at the destination phone and because it would help conserve wireless bandwidth.

Many prior art packet aging methods age out packets after a fixed timeout threshold, i.e., after the packets have not been transmitted, e.g., have been in a transmit queue for the fixed timeout threshold amount of time. However, this may not be best. For example, an increased MAC timer bound for voice packets results in a higher chance of successful transmission as more attempts are possible. On the other hand, increasing the MAC timer bound may cause more packets to arrive too late at the receiver and therefore an increased frame loss there. Thus, there is room for improvement over a method, for example, that times out packets after some constant threshold.

SUMMARY

Embodiments of the present invention include a method, and apparatus, and logic encoded in one or more computer-readable tangible medium to carry out a method.

One embodiment includes a method comprising a client station in a wireless network, e.g., a 802.11 wireless local area network (LAN) wirelessly sending information to the client station's access point including information related to the type and/or status of one or more elements in the client station that are operable for playback of time-sensitive data, such that the access point can use the sent information to set a packet age limit that is indicative of when a packet from the access point to the client station is to be aged out, i.e., dropped, the client station being operable to receive time-sensitive media data for playback; and the client station receiving packets from the access point containing time-sensitive data for playback.

In one version, the one or more elements include one or more buffers operable to reduce jitter.

In one version, the one or more elements include one or more codecs, each codec being of a codec type, each codec including a decoder operable to playback time-sensitive data.

One embodiment includes a method in an access point of a client station in a wireless network. The method comprises the access point wirelessly receiving information sent from the client station including an indication of the type and/or status of one or more elements in the client station that are operable for playback of time-sensitive data, the client station being operable to receive time-sensitive media data for playback. The method further comprises the access point using the received information to set a packet age limit that is indicative of when a packet from the access point to the client station is to be aged out; and the access point transmitting packets from the access point containing time-sensitive data for playback.

In one version, the one or more elements include one or more buffers operable to reduce jitter.

In one version, the one or more elements include one or more codecs, each codec being of a codec type, each codec including a decoder operable to playback time-sensitive data, and wherein the indication includes an indication of the relative amount of packet loss tolerable by the codec type used in the client station.

One embodiment includes a method comprising an access point of an associated client station in a wireless network determining one or more properties of a communication between the access point and the associated client station that includes time-sensitive data. The method further comprises the access point setting or changing a packet age limit based on the determined properties, the packet age limit being indicative of when a packet from the access point to the client station is to be aged out, such that different packet streams sent from the access point to the associated client station and containing time sensitive data can have different packet age limits at the access point.

One embodiment includes a method at an access point of a wireless network. The method comprises setting a packet age limit for a particular stream of packets containing time sensitive data between the access point and an associated client station, the setting according to one or more of: (a) properties of the client station jitter buffer; (b) codec type used at the client station for the stream; (c) end-to-end delay statistics for the stream, and/or (d) wireless network load for the stream, such that different streams between the access point and the client station have different packet age limits.

One embodiment includes logic encoded in one or more tangible media for execution and when executed in an access point in a wireless network, operable to set a packet age limit for a particular stream of packets containing time sensitive data between the access point and an associated client station, the setting according to one or more of: (a) properties of the client station jitter buffer; (b) codec type used at the client station for the stream; (c) end-to-end delay statistics for the stream, and/or (d) wireless network load for the stream, such that different streams between the access point and the client station have different packet age limits.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

DESCRIPTION OF EXAMPLE EMBODIMENTS

Embodiments of the present invention include a method, and apparatus, and logic encoded in one or more computer-readable tangible medium to carry out a method. The method is to set a packet age parameter for an access point for communicating time-sensitive data to an associated client station. Another embodiment is to set other parameters, such as a retry limit for the access point.

Embodiments of the present invention include, in a wireless network, determining the packet age timeout, a quantity denoted PAT, using factors that include feedback from a wireless client station and information about the wireless network.

The description herein will be in terms of a wireless network such as a wireless local area network (WILAN), e.g., a WILAN that conforms to the IEEE 802.11 standard. Furthermore, the embodiments described herein will be mostly described in terms of voice over IP (VoIP). Those in the art will understand that the invention is not limited to voice over IP, and the invention may be applicable to communicating other time-sensitive data streams, e.g., audio, video, and/or other forms of media.

Figure 1:
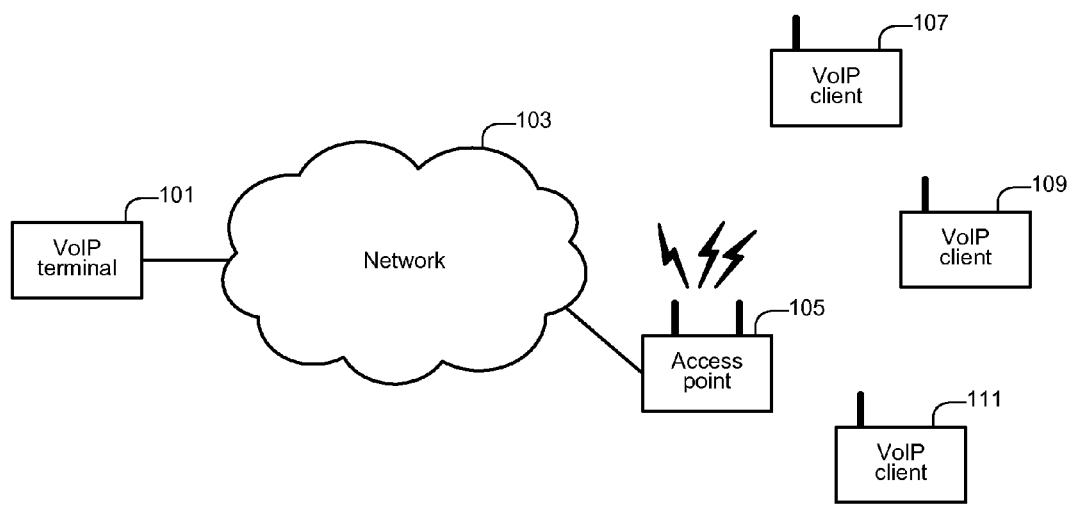
FIG. 1 shows an example arrangement in which an embodiment of the present invention can operate.

FIG. 1 shows an arrangement in which a voice over IP (VoIP) terminal 101 communicates voice data with a wireless client station 107 that is VoIP capable. The wireless VoIP client station 107 is part of an infrastructure wireless network that includes an access point (AP) 105 and that is coupled to a network 103 to which the VoIP terminal 101 is also coupled. The network 103 can include other wireless networks and wired network segments, and may include, e.g., the Internet. Other wireless VoIP client stations 109 and 111 that are associated with AP 105 also are shown in FIG. 1.

Figure 2:
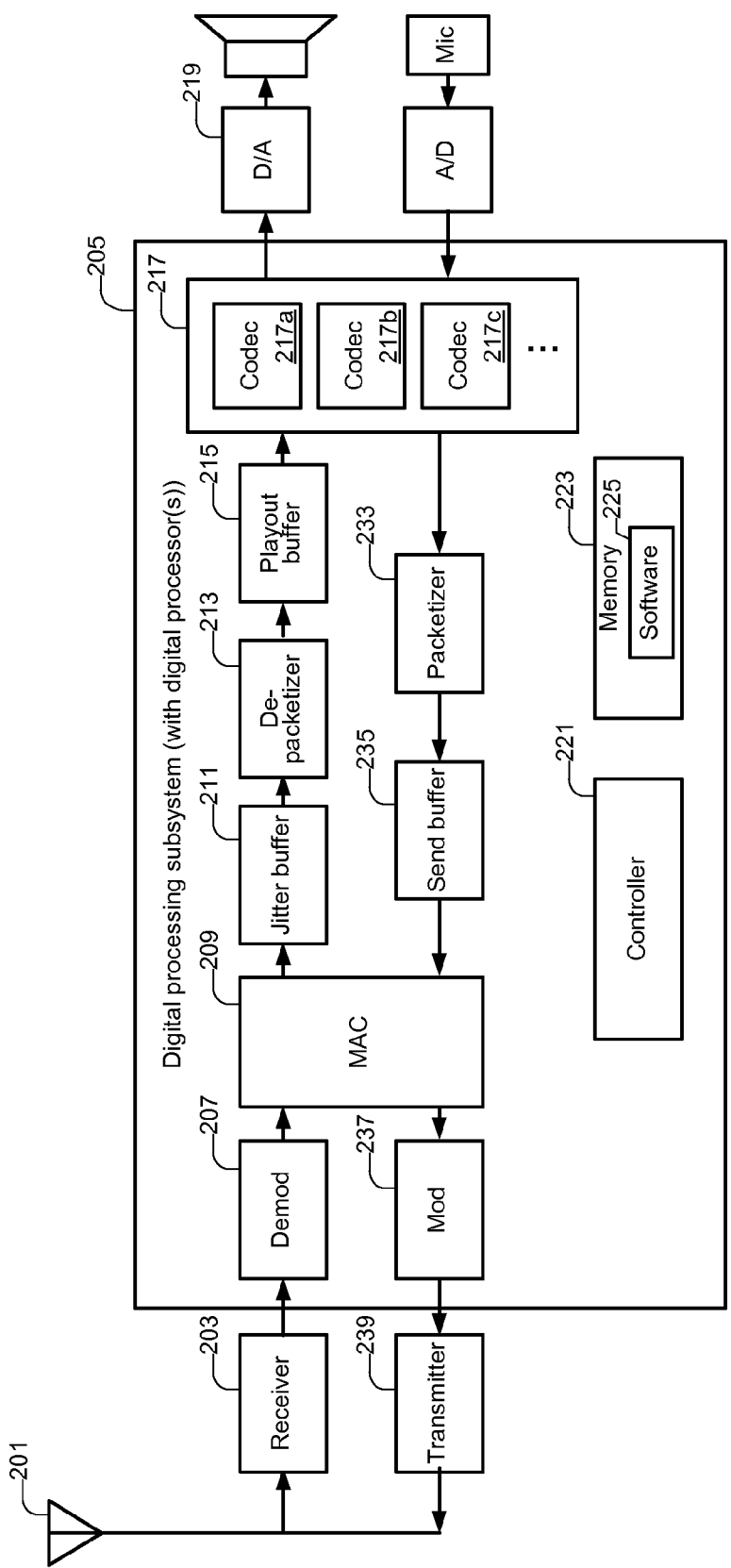
FIG. 2 shows an example embodiment of a client station 107.

FIG. 2 shows an example embodiment of the voice client station 107. This is a simplified block diagram, so some elements are not shown. While FIG. 2 shows an example of a VoIP client station, those in the art will understand that other wireless client stations for receiving and transmitting time-sensitive data, e.g., audio and/or video include similar elements. Referring to FIG. 2, the example client station 107 includes a receive path and a transmit path. The receive path includes one or more antennas 201 and a radio receiver 203 that is typically part of a radio transceiver. At some stage the received signal is digitized by a digitizer, and the received signals in the remainder of the receive path are processed in digital form until they are converted to analog form for playback through some analog transducer. In the example of FIG. 2, the digital processing for the receive path (and for the transmit path) is shown carried out in a digital processing subsystem 205 that includes one or more digital processors. The digital processing subsystem 205 includes a memory 223. The memory is shown to include software 225 that, in one embodiment, includes software operable to carry out, when executed by one or more of the processors, a method embodiment of the invention. In one embodiment, a controller 221 is included and controls embodiments of the present invention that include providing feedback to the access point to which the client station 107 is associated with when the client station 107 is operational. In one embodiment, the controller 221 is formed by executing software in one or more of the processor(s) in the digital processing subsystem 205, e.g., executing software 225 that is in memory 223 of the digital processing subsystem 205.

Different implementations may form the functional blocks in block 205 described in FIG. 2 by different mechanisms, partitioned in different ways. Therefore, FIG. 2 is an example of only one partitioning. Some of the functional blocks may be implemented by software executing in one or more of the processors, others in hardware, and yet others by a combination of hardware and software.

Continuing with the digital processing part of the receive path, the received signal is demodulated otherwise decoded in demodulation unit 207 to form media access control (MAC) frames, and a MAC processor 209 to form received data packet. For receiving time-sensitive data packets, the wireless client includes a jitter buffer 211 that reduces jitter caused by different amounts of jitter delay, and also a de-packetizer 213 that correctly orders the data from the jitter buffer 211 for decoding and playback. In some embodiments, there is further buffering in a playout buffer 215 that generates a constant delay for playback. Data for playback is decoded, e.g., decompressed in an appropriate decoder in a codec subsystem 217 that in one embodiment includes a plurality of codecs 217a, 217b, 217c . . . of different codec types, e.g., for voice data, each conforming to ITU-T recommendations G711 , G.723 and G729, respectively.

A digital-to-analog converter 219 converts the decoded data to analog form for playback by an output transducer, e.g., a loudspeaker.

For sending, e.g., voice data, the transmit path of the client station 107 includes a voice transducer, e.g., a microphone, and an analog-to-digital converter to form digital data. The digital data is digitally processed by the transmit path part of the digital processing subsystem 205 that includes a coding part of the codec subsystem 217 and a packetizer 233 to form packets for transmission. The transmit path may include a send buffer 235, e.g., a UDP buffer in the case that the data is sent as UDP packets, e.g., using RTP/UDP/IP.

The packets for transmission are processed by the MAC processor 209 that forms a bitstream of MAC frames for transmission. These MAC frames are coded as required and modulated by a modulator 237 to form a signal for transmission. The transmit path includes another digital-to-analog converter to form analog signals for transmission. The signals are transmitted by a transmitter 239, e.g., of a transceiver, and via one or more antennas that, in one embodiment, are the same as the receive antennas 201.

In one embodiment, the time-sensitive data is sent as RTP packets, e.g., using IP/UDP/RTP.

Figure 3:
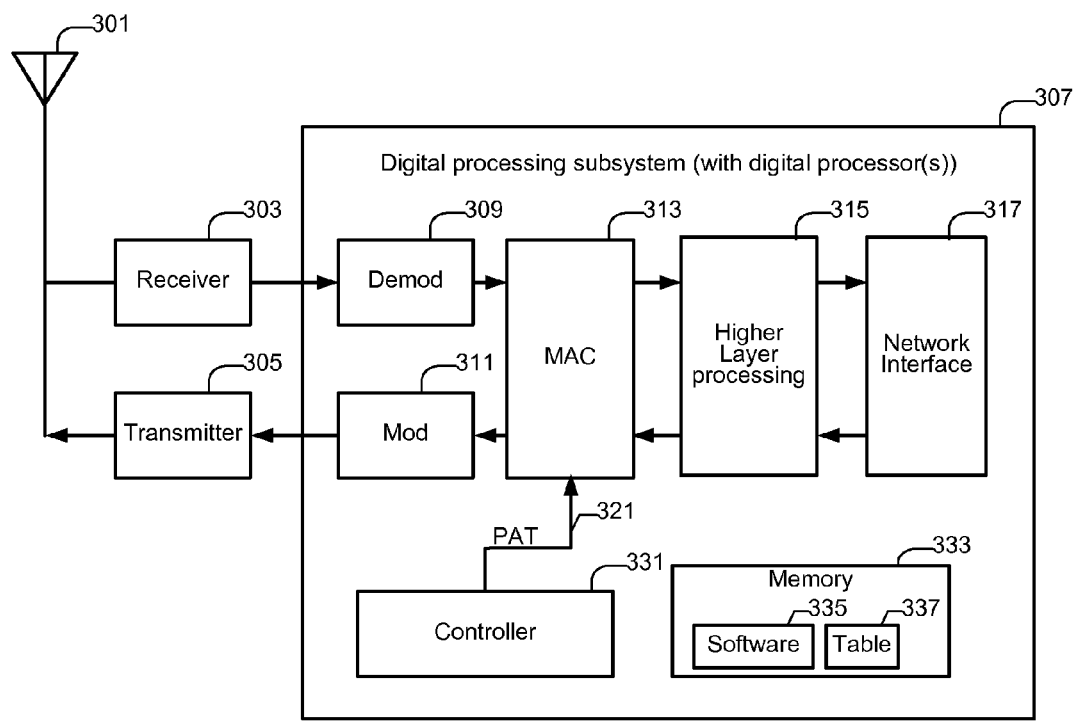
FIG. 3 shows an example embodiment of an access point.

FIG. 3 shows an example embodiment of an access point, e.g., the access point 105 of FIG. 1. This is a simplified block diagram, so some elements are not shown. The example client station 105 includes a receive path and a transmit path. The AP 105 includes one or more antennas 301, a radio receiver 303 and a radio transmitter 305 that are in a radio transceiver. At some stage the received signal from the receiver is digitized by a digitizer, and similarly, at some stage, a digital signal for transmission is converted to analog form to the transmitter 305. The signals in the remainder of the receive and transmit paths are processed in digital form. In the example of FIG. 3, the digital processing for the receive path and transmit paths are shown carried out in a digital processing subsystem 307 that includes one or more digital processors. The digital processing subsystem 307 includes a memory 333. The memory is shown to include software 335 that, in one embodiment, includes software operable to carry out, when executed by one or more of the processors, a method embodiment of the invention.

Different implementations may form the functional blocks in block 307 described in FIG. 3 by different mechanisms, partitioned in different ways. Therefore, FIG. 3 is an example of only one partitioning. Some of the functional blocks may be implemented by software executing in one or more of the processors, others in hardware, and yet others by a combination of hardware and software.

In the receive path of the digital processing subsystem 307, the received signal is demodulated otherwise decoded in demodulation unit 309 to form media access control (MAC) frames, and a MAC processor 313 to form received data packet. The received data is then processed by a higher layer processing subsystem 315. In one embodiment, a network interface 317 is included to connect the access point 105 to a wired network.

The transmit path of the digital processing subsystem 307 includes the network interface 317 coupled to higher layer processing subsystem 315 which in turn is coupled by the MAC processor 313 to form MAC frames for transmission. These are modulated and coded by a modulator 311 that produces data for transmission by the transmitter 305 (after conversion to analog data).

The transmitter is coupled to one or more transmit antennas that in the embodiment of FIG. 3 are the one or more antennas 301 also used for reception.

Some embodiments of the invention include the access point 107 setting a limit, e.g., a packet age limit in the form of a parameter called the packet age timeout (PAT) 321. In one embodiment, the PAT 321 is set by a controller 331 and is a limit, e.g., parameter used by the MAC processor 313. In one embodiment, the controller is formed by executing software in one or more of the processor(s) in the digital processing subsystem 307, e.g., executing software 335 that is in memory 333 of the digital processing subsystem 307. The MAC processor in one embodiment is operable to not send MAC frames that include data that is older than the PAT.

Thus, for time-sensitive data communication, e.g., audio such as VoIP and/or video, a client station in such a wireless network includes one or more buffers that are operable to reduce jitter. One such buffer is a so-called jitter buffer shown as buffer 211 in FIG. 2. Furthermore, for playback of time-sensitive streams, e.g., audio such as voice and/or video, a client station for playback may include a playout buffer, shown as buffer 215 in FIG. 2. This also is a buffer operable to reduce jitter. Note that in many embodiments the jitter buffer and the playout buffer are the same buffer 215, and what is shown as the jitter buffer 211 in FIG. 2 is a buffer used only for de-packetizing, e.g., generating correctly ordered data in the case that packets arrive out-of-order.

Different wireless client stations have one or more buffers operable to reduce jitter, e.g., one or more jitter buffers and/or playout buffers that are of different size. Furthermore, different wireless client stations use different methods to manage their respective jitter buffer and/or their respective playout buffer. Thus, a wireless client station has information useful to determine what packet is played back at a given point of time. Therefore, it may be an advantage for an AP to know information related to the size(s) of buffer(s) in an associated client station and to set the PAT using information including information related to the client station's jitter and/or playout buffer size(s).

Different wireless client stations may use different codec types, e.g., in the case of audio, e.g., VoIP, codecs that conform to ITU-T G.711, to G.723, and/or to G.729 are typically included. Some codec types are more tolerant to packet loss than others. Therefore, it may be an advantage for an AP to have information related to codec type used in an associated client station such as the packet loss tolerance of each codec type, and to set the PAT using information that includes information related to the codec type.

One embodiment of the present invention is a method at a client station that sends feedback, e.g., in real time to the client station's AP. i.e., the AP to which the client station is associated such that the received feedback at the AP is operable by the AP to set its packet age limit, e.g., its packet age timeout (PAT) parameter. In one embodiment the feedback includes information related to the client station's jitter and/or playout buffer size(s), and in another embodiment, the feedback includes information related to the client station's codec type(s).

Another embodiment of the present invention includes an AP receiving feedback from a client station of the AP, i.e., a client station that is associated with the AP, and the AP setting its packet age limit, e.g., its PAT parameter using information that includes information from the received feedback. In one embodiment, the feedback includes information related to the client station's jitter and/or playout buffer size(s), and in another embodiment, the feedback includes information related to the client station's codec type(s).

Figure 4A:
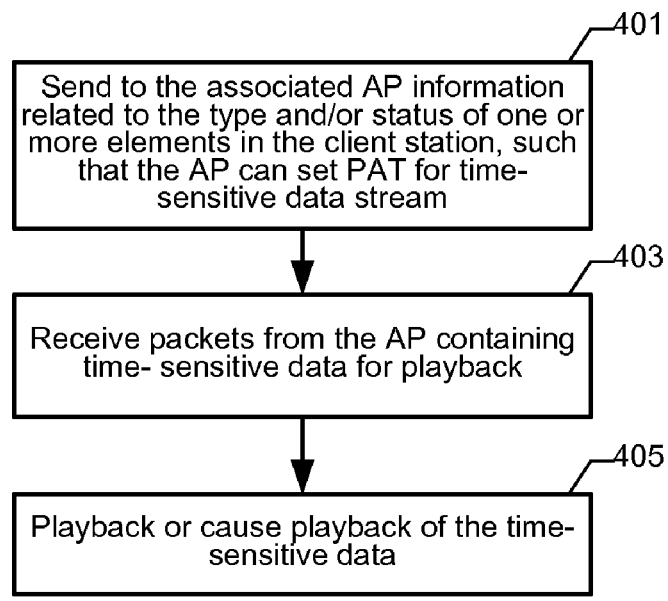
FIG. 4A shows a simplified flowchart of a method embodiment in a client station that is associated to an AP.

FIG. 4A shows a simplified flowchart of a method embodiment in a client station that has an AP, i.e., that is associated to an AP. The method includes in 401 the client station wirelessly sending information to the client station's access point including information related to the type and/or status of one or more elements in the client station that are operable for playback of time-sensitive data, such that the access point can use the sent information to set a packet age limit that is indicative of when a packet from the access point to the client station is to be aged out. The client station is operable to receive time-sensitive media data for playback. The method embodiment further includes, in 403, the client station receiving packets from the access point containing time-sensitive data for playback. In one embodiment, the client station includes, in 405, playing back the time-sensitive data, or in another version, the client station causing playback, e.g., to playback equipment attached to the client station.

Figure 4B:
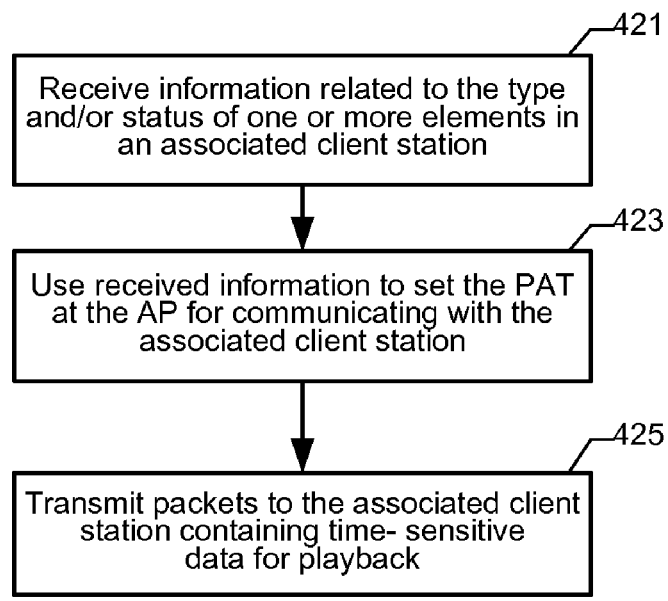
FIG. 4B shows a simplified flowchart of a method embodiment in an AP that has a client station associated to it.

FIG. 4B shows a simplified flowchart of a method embodiment in an AP of a client station, i.e., in an AP that has a client station associated to it. The method includes in 421 the AP wirelessly receiving information sent from the client station, including an indication of the type and/or status of one or more elements in the client station that are operable for playback of time-sensitive data. As in the case of FIG. 4A, the client station is operable to receive time-sensitive media data for playback. In 423, the method includes the AP using the received information to set a packet age limit that is indicative of when a packet from the access point to the client station is to be aged out, and in 425, the method includes the AP transmitting packets to the associated client station containing time-sensitive data for playback.

In one embodiment, the one or more elements in the client station include one or more codecs, each codec being of a codec type, each codec including a decoder operable to playback time-sensitive data. In one such embodiment, the information sent by the client station that is related to the type and/or status of one or more elements includes an indication of the relative amount of packet loss tolerable by the codec type used in the client station.

In one embodiment, the sending of the indication of the relative amount of packet loss tolerable by the codec type used in the client station is during a call setup between the client station and the AP.

Consider, for example, call setup in an embodiment that conforms to the IEEE 802.11 standard. Admission control is negotiated by the use of what is called a traffic specification (TSPEC). A client station specifies its traffic flow requirements, e.g., data rate, delay bounds, packet size, or others, or a combination of such factors, and requests the access point to admit the flow by sending an "add TSPEC management action frame" (ADDTS frame). In one embodiment, based on the current conditions, the AP may admit or deny the new TSPEC request. In this example, the client station 111 initiates the call with a call request in the form of an ADDTS request that includes a TSPEC that contains the call requirements. The ADDTS request includes a TSPEC in the form of one or more TSPEC information elements (IEs). One embodiment of the present invention defines a new information element (IE), e.g., a new vendor-specific IE for inclusion in an ADDTS exchange and that can contain information on the packet-loss tolerance of the codec the wireless client station will use in the call. In alternate embodiments, different formats and mechanisms are used to transport the information with a call admission request.

In one embodiment, the new IE provides to the AP an indication (as a percentage) of packet loss tolerable by the codec. In another embodiment, the IE provides an indication of packet loss using a less granular indication, e.g., one of three values that indicates one of a relatively low packet-loss tolerance, a relatively medium packet-loss tolerance, or a relatively high packet-loss tolerance.

In the AP, e.g., AP 105, a data structure, e.g., a table 337 is stored in memory 333 that provides PAT values for a set of packet-loss data, e.g., percentage. The AP looks up the table 337 to determine the PAT value 321 to use to communicate with the client station. In one embodiment, the table 337 is filled empirically prior to operation. Of course data structures other than tables can be used in alternate embodiments.

In more detail, in one embodiment, for call set up, in which the wireless network conforms to the IEEE 802.11 standard, the client station initially sends a TSPEC using an ADDTS request frame to its AP requesting bandwidth. The TSPEC includes one or more data rate parameters and one or more MAC service data unit size (MSDU size) parameters. Upon receiving the ADDTS request frame, the AP, e.g., the controller 331 of the AP is arranged to determine a service interval based on the data rate and MSDU size parameters in the TSPEC. Typically, in one embodiment, such a determination will yield a 20-ms or 30-ms packetization interval. The AP determines a packet age limit, e.g., PAT parameter commensurate with the determined packetization interval.

At the client station side, the client station, knowing its packetization interval, is operable to set its packet age limit, e.g., PAT parameter by itself without any feedback from the AP.

One embodiment includes feedback during the call. In one embodiment, the one or more elements in the client station 107 include one or more buffers operable to reduce jitter. The sending of information from the client station to the AP includes, during a call that includes communication of time-sensitive data between the client station and the AP, sending a request for the AP to increase or decrease the packet age limit based on the arrival time of packets from the AP relative to the size and/or occupancy of at least one of the one or more buffers.

One embodiment uses the Real Time Protocol (RTP)—see for example RFC 3550 and also RFC 3551 from the IETF at http://www.ietf.org—for communication of time-sensitive data between the client station and the AP, e.g., a stream of RTP/UDP/IP packets, so that RTP packet streams are communicated. Furthermore, such an embodiment uses Real Time Transport Control Protocol (RTCP or RTP Control Protocol). In one such embodiment, the method includes the client station using RTCP statistics for the RTP packet stream to ascertain whether the request is to increase or decrease the packet age limit. In particular, the ascertaining of whether the request is to increase or decrease the packet age limit uses information on the relative end-to-end delay for time-sensitive data between a sender and the client station, the relative end-to-end delay being relative to a delay budget and the size of at least one of the one or more buffers operable to reduce jitter.

One embodiment includes the client station initially sending information related to the one or more codecs, e.g., as part of call setup, e.g., using an ADDTS exchange, and in addition, and relatively infrequently, the client station sending a request to its AP to increase or decrease the packet age limit. In one embodiment, the request sent to the AP to increase or decrease the packet age limit includes a specification of the particular traffic stream. In one embodiment, the specification of the particular traffic stream includes a combination of the client station's MAC address and the transport stream identifier (TSID) of the transport stream of time-sensitive data.

In one embodiment, the request to the AP to increase or decrease the packet age limit is sent in management frames. One embodiment uses a new, e.g., vendor-specific management frame that can include the request to the AP.

In one embodiment, after the call set-up, the sending of the request to the AP to increase or decrease the packet age limit occurs relatively infrequently. In one embodiment, the controller 331 of the client station is configured to send feedback every five seconds. In another embodiment, the time between sending increase or decrease requests is according to a periodic clock with a settable period. In one embodiment, a request is sent only if there is a change in the AP's packet age limit requested. In another embodiment, the request to the AP to increase or decrease the packet age limit is sent only at the potential send times and only if the change is above a threshold relative amount, e.g., above 50%.

In one embodiment, the feedback is sent using management frames. In one embodiment, a new, e.g., vendor-specific management frame is defined and used for this purpose. In alternate embodiments, different frame formats are used to transport the information.

Figure 5A:
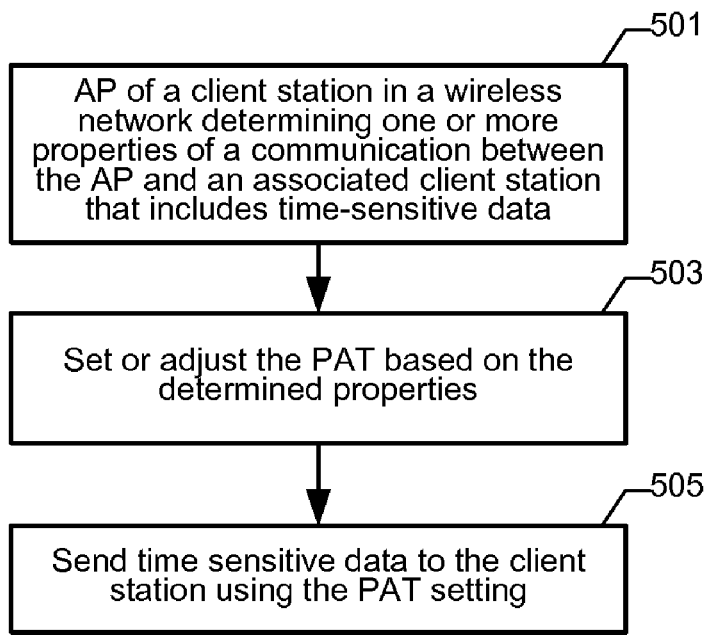
FIG. 5A shows a simplified flowchart of one embodiment of the invention.

One embodiment of the invention is illustrated by the simplified flowchart of FIG. 5A. Some versions require no explicit feedback from the client station to the access point, while others include one or more messages being sent to the access point for setting the packet age limit. The method includes in 501 an access point of an associated client station in a wireless network determining one or more properties of a communication between the access point and the associated client station that includes time-sensitive data, and in 503, the access point setting or changing a packet age limit based on the determined properties, such that different packet streams sent from the access point to the associated client station and containing time sensitive data can have different packet age limits at the access point. The method includes in 505 the AP sending time sensitive data to the client station using the PAT setting.

One embodiment of the invention includes the AP setting its packet age limit according to channel load. In one embodiment, this occurs in addition to the feedback described above. In one embodiment, this occurs without feedback from the client station. One feedback version includes only the initial feedback on the codec type. Another embodiment includes the additional feedback that includes an instruction for the AP of a client station to increase or decrease the PAT.

The following is one rationale for the AP to use the channel load to set the packet age limit, e.g., PAT parameter. Using VoIP for illustrative purposes, it is possible, for example, that a high value of PAT at high channel load could adversely effect the voice quality and channel load by transmitting packets that would likely reach a receiving client station after multiple retries, but too late for use at the client station. One method of controlling this might be to limit the number of retries. However, there is an advantage in also, or instead of, adjusting the PAT according to the channel load for a given channel.

Consider again VoIP as an example. Different voice calls typically have different end-to-end delays. Furthermore, in general, a voice conversation is intelligible only up to a certain upper limit of the end-to-end delay. If the end-to-end delay is known to be low for a particular call, there may be some leeway for adjusting the delay budget for a particular wireless hop for the particular call. This input could be used in adjusting the PAT, thus potentially improving the voice quality of a particular call.

Figure 5B:
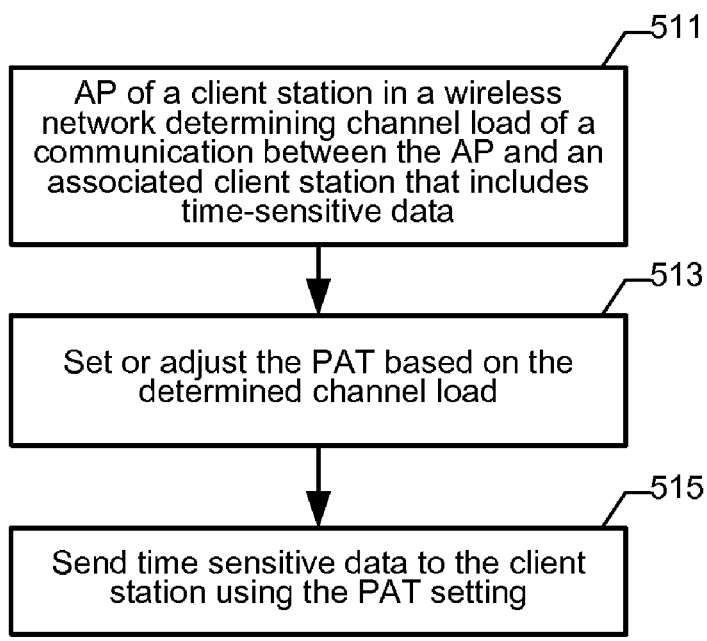
FIG. 5B shows a simplified flowchart of a method at an AP.

FIG. 5B shows a simplified flowchart of a method at an AP that includes in 511 the AP determining the channel load of a communication between the AP and an associated client station that includes time-sensitive data. The method includes in 513 the AP setting or changing the PAT based on the determined channel load. For example, in one embodiment, the AP uses a relatively high PAT if the channel load is determined to be relatively low, and decreases the PAT if determined channel load is relatively high. The inventors have found that this can improve the average voice quality for phone calls on the channel. The method includes in 515 sending packets containing time sensitive information to the client station using the PAT setting.

Figure 6:
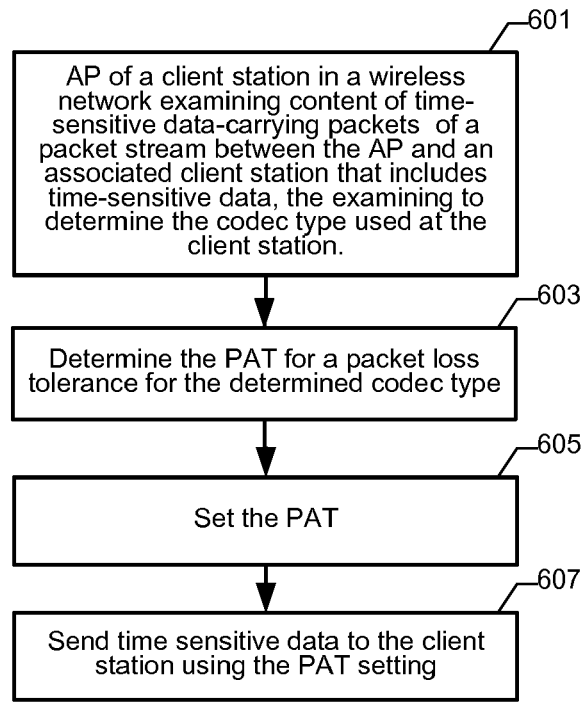
FIG. 6 shows a simplified flowchart of another embodiment of a method at an AP.

Other embodiments include the AP setting its packet age limit, e.g., PAT parameter according to the codec type, but without requiring the client station to send feedback to the AP regarding the codec type. FIG. 6 shows one embodiment of a method that includes, in 601, for a call involving time-sensitive data between the AP and an associated client station, the AP examining the content of time-sensitive carrying packets between the AP and the associated client station and determining from the examined packet content the codec type used at the associated client station. Information is stored at the AP that relates codec type to the relative amount of packet loss tolerable by the codec type used in the client station. In one embodiment, in the AP, e.g., AP 105, a data structure, e.g., a table 337 is stored in memory 333 that provides PAT values for a set of packet-loss data, e.g., percentage packet-loss. The method includes in 603 the AP looking up the table 337 to determine the PAT value 321 to use to communicate with the client station. In one embodiment, the table 337 is filled empirically prior to operation. Of course data structures other than tables can be used in alternate embodiments. In 605, the AP sets the PAT, and in 607, the AP communicates packets containing time-sensitive information to the client station using the PAT setting.

Figure 7:
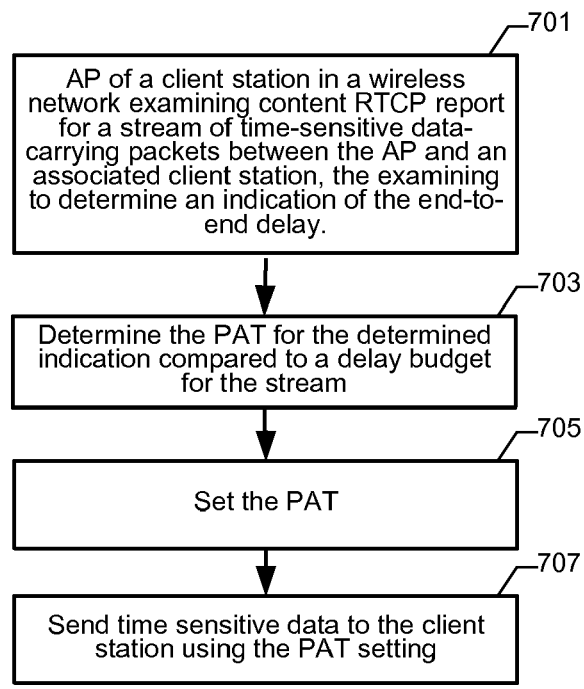
FIG. 7 shows a simplified flowchart of another embodiment of a method at an AP.

Other embodiments include the AP setting its packet age limit, e.g., PAT parameter according to delay in communication, but without requiring the client station to send feedback to the AP regarding the delay. FIG. 7 shows one such method embodiment. Using an example of communication of time-sensitive data between the client station and the AP, e.g., a stream of RTP/UDP/IP packets, in one embodiment, in 701 during a call and for a particular packet stream between the AP and an associated client station, the AP snoops the RTCP end-to-end delay report, i.e., searches the content of packets and examines the content of one or more packets containing RTCP end-to-end delay report for the particular traffic stream, in order to determine an indication of the end-to-end delay. The AP further determines in 703 the PAT for the end-to-end delay indications compared to a delay budget, e.g., compared to the downlink queue delay for the particular stream at the AP. If the end-to-end delay is relatively low, the AP can allow more leeway to the delay budget of the wireless hop between the AP and the client station. The AP thus accordingly increases its PAT for the particular stream. Thus, in 705, the AP adjusts or sets the PAT for the particular stream according to the PAT determined in 703. In 707, the AP sends time-sensitive data to the client station using the PAT. Note that in some embodiments, there may be no adjusting the PAT in 705. One embodiment only changes the PAT is the change is large enough.

One embodiment includes using the mechanisms described above to adjust other AP limits, e.g., the packet retry limit at the AP.

In one embodiment, a computer-readable carrier medium carries a set of instructions that when executed by one or more processors of an access point of a wireless network cause the one or more processors to carry out a method in the access point of setting one or more parameters, e.g., the packet age limit, and/or the retry limit.

In one embodiment, a computer-readable carrier medium carries a set of instructions that when executed by one or more processors of a client station associated with an access point of a wireless network cause the one or more processors to carry out a method in the client station of sending information to the access point usable by the access point to set one or more parameters, e.g., the packet age limit, and/or the retry limit.

In keeping with common industry terminology, the terms "base station", "access point", and "AP" may be used interchangeably herein to describe an electronic device that may communicate wirelessly and substantially simultaneously with multiple other electronic devices, while the terms "client station," "terminal", "endpoint", "user equipment (UE)", "mobile device" and "wireless client station" may be used interchangeably to describe any of those multiple other electronic devices, which may have the capability to be moved and still communicate, though movement is not a requirement. However, the scope of the invention is not limited to devices that are labeled with those terms.

While an embodiment has been described for operation in a wireless network that conforms to the IEEE 802.11 standard, the invention may be embodied in devices that operating in a network that conforms to other standards, or that does not conform to any publicly known standard, and for other applications, including, for example other WLAN standards and other wireless standards. Applications that can be accommodated include wireless Ethernet, HIPERLAN 2, European Technical Standards Institute (ETSI) broadband radio access network (BRAN), and multimedia mobile access communication (MMAC) systems, Worldwide Interoperability for Microwave Access (WiMAX/802.16), wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., steps, is implied, unless specifically stated.

The methodologies described herein are, in one embodiment, performable by one or more processors that accept computer-readable (also called machine-readable) logic encoded on one or more computer-readable media containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries logic (e.g., software) including a set of instructions to cause performing, when executed by one or more processors, one of more of the methods described herein. The software may reside in the hard disk, or may also reside, completely or at least partially, within the RAM and/or within the processor during execution thereof by the computer system. Thus, the memory and the processor also constitute computer-readable carrier medium on which is encoded logic, e.g., in the form of instructions.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a client station machine in server-client station network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of an access point, or a client station. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries logic including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any tangible computer-readable storage medium that is capable of storing a set of instructions for execution by one or more of the processors and that cause the one or more processors to perform any one or more of the methodologies of the present invention. A carrier medium may take many tangible computer-readable storage medium forms, including but not limited to non-volatile tangible computer-readable storage medium media, and dynamic memory media. Non-volatile media includes, for example, optical, magnetic disks, and magneto-optical disks. An example of dynamic memory, is as in commonly used main memory. For example, the term "carrier medium" shall accordingly be taken to include the following tangible computer-readable storage medium forms: solid-state memories, and computer product embodied in optical and magnetic media.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

"Variants of the IEEE 802.11 standard" as used herein means the variants and proposed variants of the IEEE 802.11 standard. Variants are versions defined in clauses of the standard and proposed amendments of the standard.

Furthermore, the invention is not limited to any one type of network architecture and method of encapsulation time sensitive data, or to any type of time-sensitive data, and thus may be utilized in conjunction with one or a combination of other network architectures/protocols.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method comprising:
   a client station in a wireless network wirelessly sending information to the client station's access point including information related to the type and/or status of one or more elements in the client station that are operable for playback of time-sensitive data, such that the access point can use the sent information to set a packet age limit that is indicative of when a packet from the access point to the client station is to be aged out, the client station being operable to receive time-sensitive media data for playback, the one or more elements include one or more buffers configured to reduce jitter; and the client station receiving packets from the access point containing time-sensitive data for playback, wherein at least one of A, B, and C is true, A being that the information includes information related to one or more properties of one or more of the buffers, B being that the one or more elements include one or more codecs, each codec being of a codec type, each codec including a decoder configured to playback time-sensitive data, and the information includes information related to the type of at least one codec, and C being that the information includes a request to increase or decrease the packet age limit, wherein the sending of information to the access point includes, during a call that includes communication of time-sensitive data between the client station and the access point, sending a request for the access point to increase or decrease the packet age limit based on the arrival time of packets from the access point relative to the size and occupancy of at least one of the one or more buffers, and wherein the client station ascertains whether to request increasing or decreasing the packet age limit using information on the relative end-to-end delay for time-sensitive data between a sender and the client station, the relative end-to-end delay being relative to a delay budget and the size of at least one of the one or more buffers configured to reduce jitter.

2. A method as recited in claim 1, wherein the information includes information related to one or more properties of one or more of the buffers.

3. A method as recited in claim 1, wherein the communication of time-sensitive data between the client station and the access point includes an RTP packet stream, the method further comprising:

the client station using Real Time Transport Control Protocol (RTCP) statistics for the RTP packet stream to ascertain whether the request is to increase or decrease the packet age limit.

4. A method as recited in claim 1, wherein the one or more elements include one or more codecs, each codec being of a codec type, each codec including a decoder configured to playback time-sensitive data, and the information includes information related to the type of at least one codec.

5. A method as recited in claim 1, wherein the one or more elements include one or more codecs, each codec being of a codec type, each codec including a decoder configured to playback time-sensitive data, and wherein the information related to the type and/or status of one or more elements includes an indication of the relative amount of packet loss tolerable by the codec type used in the client station.

6. A method as recited in claim 1, wherein the one or more elements include one or more codecs, each codec being of a codec type, each codec including a decoder configured to playback time-sensitive data, wherein the indication includes an indication of the relative amount of packet loss tolerable by the codec type used in the client station, and wherein the sending is during a call setup between the client station and the access point.

7. A method as recited in claim 1, wherein the time-sensitive data includes audio data.

8. A method in an access point of a client station in a wireless network, the method comprising:

the access point wirelessly receiving information sent from the client station including an indication of the type and/or status of one or more elements in the client station that are operable for playback of time-sensitive data, the client station being operable to receive time-sensitive media data for playback, the one or more elements include one or more buffers configured to reduce jitter;

the access point using the received information to set a packet age limit that is indicative of when a packet from the access point to the client station is to be aged out; and the access point transmitting packets to the client station, the packets containing time-sensitive data for playback at the client station, wherein at least one of A, B, and C is true, A being that the information includes information related to one or more properties of one or more of the buffers, B being that the one or more elements include one or more codecs, each codec being of a codec type, each codec including a decoder configured to playback time-sensitive data, and the information includes information related to the type of at least one codec, and C being that the information includes a request to increase or decrease the packet age limit, wherein the sending of information to the access point includes, during a call that includes communication of time-sensitive data between the client station and the access point, sending a request for the access point to increase or decrease the packet age limit based on the arrival time of packets from the access point relative to the size and occupancy of at least one of the one or more buffers, and wherein the client station ascertains whether to request increasing or decreasing the packet age limit using information on the relative end-to-end delay for time-sensitive data between a sender and the client station, the relative end-to-end delay being relative to a delay budget and the size of at least one of the one or more buffers configured to reduce jitter.

9. A method as recited in claim 8, wherein the sending of information to the access point includes, during a call that includes communication of time-sensitive data between the client station and the access point, sending a request for the access point to increase or decrease the packet age limit based on the arrival time of packets from the access point relative to the size and occupancy of at least one of the one or more buffers.

10. A method as recited in claim 8, wherein the one or more elements include one or more codecs, each codec being of a codec type, each codec including a decoder configured to playback time-sensitive data.

11. A method as recited in claim 8, wherein the one or more elements include one or more codecs, each codec being of a codec type, each codec including a decoder configured to playback time-sensitive data, and wherein the indication includes an indication of the relative amount of packet loss tolerable by the codec type used in the client station.

12. A method as recited in claim 8, wherein the one or more elements include one or more codecs, each codec being of a codec type, each codec including a decoder configured to playback time-sensitive data, wherein the indication includes an indication of the relative amount of packet loss tolerable by the codec type used in the client station, and wherein the sending is during a call setup between the client station and the access point.

13. A method comprising:

an access point of an associated client station in a wireless network determining one or more properties of a communication between the access point and the associated client station that includes time-sensitive data, the associated client station operable to receive time-sensitive media data for playback; and the access point setting or changing a packet age limit based on the determined properties, the packet age limit being indicative of when a packet from the access point to the client station is to be aged out, such that different packet streams sent from the access point to the associated client station and containing time sensitive data can have different packet age limits at the access point, wherein at least one of A, B, C, and D is true, A being that the one or more properties include the type of codec used at the client station for a communication of a stream of time-sensitive data packets between the access point and the associated client station, B being that the associated client station includes one or more buffers configured to reduce jitter, and that the access point also uses information wirelessly received from the associated client station including an indication of the type and/or status of one or more of the buffers to set or change the packet age limit, C being that the associated client station includes one or more codecs, each codec being of a codec type, each codec including a decoder configured to playback time-sensitive data, and that the access point also uses information wirelessly received from the associated client station related to the type of at least one codec, and D being that the access point also uses a request wirelessly received from the associated client station to increase or decrease the packet age limit to set or change the packet age limit, wherein communication between the access point and the associated client station includes packets containing reports with an indication of the end-to-end delay for a particular stream of time-sensitive data-carrying packets between the access point and the client station, wherein the one or more properties includes the indication of the end-to-end delay for the particular stream, the method further comprising:

determining a packet age setting for the particular stream using the determined indication of packet age limit compared to a delay budget for the stream, such that the access point setting or changing of the packet age limit includes setting or changing based on the determined packet age setting.

14. A method as recited in claim 13, wherein the one or more properties include the channel load of a communication between the access point and the associated client station that includes time-sensitive data, and such that the access point setting or changing of the packet age limit includes setting or changing based on the determined channel load.

15. A method as recited in claim 13, wherein the client station includes one or more codecs each of a respective codec type, each codec type having a packet loss tolerance, and wherein the one or more properties include the type of codec used at the client station for a communication of a stream of time-sensitive data packets between the access point and the associated client station, the method further comprising:

determining a packet age setting for a packet loss tolerance for the determined codec type, such that the access point setting or changing of the packet age limit includes setting or changing based on the determined packet age setting.

16. A method as recited in claim 13, further comprising the access point wirelessly receiving information sent from the client station including an indication of the type and/or status of one or more elements in the client station that are operable for playback of time-sensitive data, the client station being operable to receive time-sensitive media data for playback; and the access point also using the received information to set or adjust the packet age limit.

17. A method as recited in claim 16, wherein the one or more elements include one or more buffers configured to reduce jitter, and wherein the sending of information to the access point includes, during a call that includes communication of time-sensitive data between the client station and the access point, sending a request for the access point to increase or decrease the packet age limit based on the arrival time of packets from the access point relative to the size and occupancy of at least one of the one or more buffers.

18. A method as recited in claim 16, wherein the one or more elements include one or more codecs, each codec being of a codec type, each codec including a decoder configured to playback time-sensitive data, and wherein the indication includes an indication of the relative amount of packet loss tolerable by the codec type used in the client station.

19. A method as recited in claim 16, wherein the one or more elements include one or more codecs, each codec being of a codec type, each codec including a decoder configured to playback time-sensitive data, wherein the indication includes an indication of the relative amount of packet loss tolerable by the codec type used in the client station, and wherein the sending is during a call setup between the client station and the access point.

20. A tangible computer-readable storage medium configured with instructions stored thereon that when executed by one or more processors cause an access point having an associated client station in a wireless network, to:

determine one or more properties of a communication between the access point and the associated client station that includes time-sensitive data, the associated client station operable to receive time-sensitive media data for playback; and set or change a packet age limit based on the determined properties, the packet age limit being indicative of when a packet from the access point to the client station is to be aged out, such that different packet streams sent from the access point to the associated client station and containing time sensitive data can have different packet age limits at the access point, wherein at least one of A, B, C, and D is true, A being that the one or more properties include the type of codec used at the client station for a communication of a stream of time-sensitive data packets between the access point and the associated client station, B being that the associated client station includes one or more buffers configured to reduce jitter, and that the access point also uses information wirelessly received from the associated client station including an indication of the type and/or status of one or more of the buffers to set or change the packet age limit, C being that the associated client station includes one or more codecs, each codec being of a codec type, each codec including a decoder configured to playback time-sensitive data, and that the access point also uses information wirelessly received from the associated client station related to the type of at least one codec, and D being that the access point also uses a request wirelessly received from the associated client station to increase or decrease the packet age limit to set or change the packet age limit, wherein communication between the access point and the associated client station includes packets containing reports with an indication of the end-to-end delay for a particular stream of time-sensitive data-carrying packets between the access point and the client station, wherein the one or more properties includes the indication of the end-to-end delay for the particular stream, and wherein a packet age setting for the particular stream is determined using the determined indication of packet age limit compared to a delay budget for the stream, such that the access point setting or changing of the packet age limit includes setting or changing based on the determined packet age setting.

21. A tangible computer-readable storage medium as recited in claim 20, wherein the associated client station includes one or more buffers configured to reduce jitter, and wherein the sending of information to the access point includes, during a call that includes communication of time-sensitive data between the client station and the access point, sending a request for the access point to increase or decrease the packet age limit based on the arrival time of packets from the access point relative to the size and occupancy of at least one of the one or more buffers.

22. A tangible computer-readable storage medium as recited in claim 20, wherein the associated client station includes one or more codecs, each codec being of a codec type, each codec including a decoder configured to playback time-sensitive data, and wherein the indication includes an indication of the relative amount of packet loss tolerable by the codec type used in the client station.

23. A tangible computer-readable storage medium configured with instructions stored thereon that when executed by one or more processors cause a client station that is associated with an access point in a wireless network to:

wirelessly send information to the client station's access point including information related to the type and/or status of one or more elements in the client station that are operable for playback of time-sensitive data, such that the access point can use the sent information to set a packet age limit that is indicative of when a packet from the access point to the client station is to be aged out, the client station being operable to receive time-sensitive media data for playback, the one or more elements include one or more buffers configured to reduce jitter; and receive packets from the access point containing time-sensitive data for playback, wherein at least one of A, B, and C is true, A being that the information includes information related to one or more properties of one or more of the buffers, B being that the one or more elements include one or more codecs, each codec being of a codec type, each codec including a decoder configured to playback time-sensitive data, and the information includes information related to the type of at least one codec, and C being that the information includes a request to increase or decrease the packet age limit, wherein the sending of information to the access point includes, during a call that includes communication of time-sensitive data between the client station and the access point, sending a request for the access point to increase or decrease the packet age limit based on the arrival time of packets from the access point relative to the size and occupancy of at least one of the one or more buffers, and wherein the client station ascertains whether to request increasing or decreasing the packet age limit using information on the relative end-to-end delay for time-sensitive data between a sender and the client station, the relative end-to-end delay being relative to a delay budget and the size of at least one of the one or more buffers configured to reduce jitter.

24. A tangible computer-readable storage medium as recited in claim 23, wherein the communication of time-sensitive data between the client station and the access point includes an RTP packet stream, the method further comprising:

the client station using Real Time Transport Control Protocol (RTCP) statistics for the RTP packet stream to ascertain whether the request is to increase or decrease the packet age limit.

25. A tangible computer-readable storage medium as recited in claim 23, wherein the one or more elements include one or more codecs, each codec being of a codec type, each codec including a decoder configured to playback time-sensitive data, and the information includes information related to the type of at least one codec.

* * * * *